United States Patent
Furuya (10) Patent No.: US 10,120,365 B2
(45) Date of Patent: Nov. 6, 2018

(54) MACHINING SYSTEM FOR ADJUSTING NUMBER OF REVOLUTIONS OF MACHINING TOOL AND FEED SPEED OF WORKPIECE

(71) Applicant: FANUC CORPORATION, Minamitsuru-gun, Yamanashi (JP)

(72) Inventor: Yoshitake Furuya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 248 days.

(21) Appl. No.: 15/151,886

(22) Filed: May 11, 2016

(65) Prior Publication Data
US 2016/0332273 A1    Nov. 17, 2016

(30) Foreign Application Priority Data

May 14, 2015 (JP) .................. 2015-098987
Jul. 7, 2015 (JP) .................. 2015-136306

(51) Int. Cl.
*G05B 19/00* (2006.01)
*B23Q 7/00* (2006.01)
(Continued)

(52) U.S. Cl.
CPC .......... *G05B 19/402* (2013.01); *B23Q 7/047* (2013.01); *B23Q 17/0966* (2013.01);
(Continued)

(58) Field of Classification Search
CPC .............. G05B 19/402; G05B 19/4166; G05B 2219/50326; B25J 11/005; B23Q 17/0971; B23Q 7/047; Y01S 901/31; Y10S 901/46
See application file for complete search history.

(56) References Cited

U.S. PATENT DOCUMENTS 4,359,815 A * 11/1982 Toyoda .............. B23Q 3/15713
                                                              414/225.01
5,011,345 A    4/1991  Nishigai et al.
(Continued)

FOREIGN PATENT DOCUMENTS

DE     3941057 C2    2/1996
DE    10259887 A1    7/2004
(Continued)

OTHER PUBLICATIONS

Notification of Reasons for Refusal for Japanese Application No. 2015-136306, dated Sep. 22, 2017, including English translation, 7 pages.

*Primary Examiner* — Ronald D Hartman, Jr.
(74) *Attorney, Agent, or Firm* — RatnerPrestia (57) ABSTRACT

A machining system of the present invention includes a robot having a hand, a processing machine to rotate a machining tool, a control unit which controls the processing machine and the robot so as to rotate the machining tool and press a workpiece held by the hand against the machining tool to thereby machine the workpiece, and a force sensor which detects force acting between the workpiece and the machining tool when the workpiece is pressed against the machining tool by the robot and is machined by the machining tool. The control unit regulates the workpiece feed speed of the robot and the rotational speed of the machining tool so that the force value detected by the force sensor is between a predetermined upper threshold and a predetermined lower threshold.

8 Claims, 7 Drawing Sheets

(51) Int. Cl.
*G06F 19/00* (2018.01)
*G05B 19/402* (2006.01)
*B23Q 7/04* (2006.01)
*B23Q 17/09* (2006.01)
*G05B 19/416* (2006.01)
*B25J 11/00* (2006.01)

(52) U.S. Cl.
CPC ......... *B23Q 17/0971* (2013.01); *B25J 11/005* (2013.01); *G05B 19/4166* (2013.01); *G05B 2219/50326* (2013.01); *Y10S 901/02* (2013.01); *Y10S 901/31* (2013.01); *Y10S 901/46* (2013.01)

(56) References Cited

U.S. PATENT DOCUMENTS

| | | | |
|---|---|---|---|
| 9,285,797 B2 | 3/2016 | Kondo | |
| 2005/0159840 A1* | 7/2005 | Lin | B23P 6/002 700/245 |
| 2006/0048364 A1* | 3/2006 | Zhang | B23Q 17/0966 29/407.08 |
| 2008/0065257 A1* | 3/2008 | He | B23Q 17/09 700/175 |
| 2008/0140257 A1* | 6/2008 | Sato | B25J 9/1633 700/258 |
| 2015/0283665 A1 | 10/2015 | Heilig et al. | |

FOREIGN PATENT DOCUMENTS

| | | |
|---|---|---|
| DE | 102004055382 B4 | 10/2009 |
| DE | 102013210582 A1 | 4/2014 |
| EP | 2614922 B1 | 4/2016 |
| JP | 11048182 A | 2/1999 |
| JP | 2004160564 A | 6/2004 |
| JP | 2005205517 A | 8/2005 |
| JP | 2008-142810 A | 6/2008 |
| JP | 2008142810 A | 6/2008 |
| JP | 2011041992 A | 3/2011 |
| JP | 2012047707 A | 3/2012 |
| JP | 2012056051 A | 3/2012 |
| JP | 2012152835 A | 8/2012 |

* cited by examiner

MACHINING SYSTEM FOR ADJUSTING NUMBER OF REVOLUTIONS OF MACHINING TOOL AND FEED SPEED OF WORKPIECE

BACKGROUND OF THE INVENTION

1. Field of the Invention

The present invention relates to a machining system provided with a robot which transfers a workpiece to a processing machine.

2. Description of the Related Art

Conventionally, a workpiece is transferred to a processing machine by a robot and is machined by a machining tool of the processing machine. In particular, in a machining operation, such as burring, polishing, or grinding, there are cases where the workpiece held by a hand of a robot is machined by a machining tool which is rotating while pressing the workpiece against the machining tool. In this connection, Japanese Patent Application Laid-Open No. 2008-142810 discloses a method for adjusting the movement of an arm portion of a robot so as to obtain an appropriate magnitude of force acting between the workpiece and the machining tool during the machining operation. Furthermore, the aforementioned Patent Application Laid-Open No. 2008-142810 discloses a force sensor attached to the arm portion of the robot to measure the force as well.

When the workpiece is pressed against the machining tool of the processing machine by the robot, the machining tool may be deteriorated (e.g., wearing of the blade or abrasive) depending on the material of the workpiece or machining time, etc. In this case, it is necessary to maintain the quality of the machined workpiece by modifying the machining conditions depending on the degree of deterioration of the machining tool. For example, it is necessary to perform machining while complexly controlling the rotational speed of the machining tool and the movement speed of the workpiece.

However, in the apparatus disclosed in the Japanese Patent Application Laid-Open No. 2008-142810, only the force acting between the workpiece and the machining tool is adjusted while the workpiece is pressed against the machining tool of the processing machine by the robot. In other words, in the Japanese Patent Application Laid-Open No. 2008-142810, the rotational speed of the machining tool and the movement speed of the workpiece are not modified depending on the degree of deterioration of the machining tool. Consequently, it is difficult to maintain the machining quality of the workpiece when the machining tool is deteriorated during the machining operation.

SUMMARY OF THE INVENTION

The present invention provides a machining system which is capable of maintaining a high machining quality of the workpiece.

According to the first aspect of the present invention, there is provided a machining system comprising a robot which has a hand provided at an arm tip to grasp a workpiece, a processing machine which has a spindle to rotate a machining tool, a control unit which controls the processing machine and the robot so as to rotate the machining tool and press the workpiece held by the hand against the machining tool to thereby machine the workpiece, and a force sensor which detects force acting between the workpiece and the machining tool when the workpiece is pressed against the machining tool by the robot and is machined by the machining tool, wherein the control unit regulates the feed speed of the workpiece pressed against the machining tool by the robot and the rotational speed of the machining tool so that the force value detected by the force sensor is between a predetermined upper threshold and a predetermined lower threshold.

According to the second aspect of the present invention, in the machining system according to the aforementioned first aspect, the control unit comprises a judgment portion which judges whether the force value detected by the force sensor is between the predetermined upper threshold and the predetermined lower threshold, and an operation commanding portion which reduces one of the workpiece feed speed and the rotational speed of the machining tool when the judgment portion judges that the detected force value is above the predetermined upper threshold; as a result, if the detected force value is still above the predetermined upper threshold, the other of the workpiece feed speed and the rotational speed of the machining tool is reduced; and which increases one of the workpiece feed speed and the rotational speed of the machining tool when the judgment portion judges that the detected force value is below the predetermined lower threshold; as a result, if the detected force value is still below the predetermined lower threshold, the other of the workpiece feed speed and the rotational speed of the machining tool is increased.

According to the third aspect of the present invention, there is provided a machining system comprising a robot which has a hand provided at an arm tip to grasp a workpiece, a processing machine which has a spindle to rotate a machining tool, a control unit which controls the processing machine and the robot so as to rotate the machining tool and press the workpiece held by the hand against the machining tool to thereby machine the workpiece, and a force sensor which detects force acting between the workpiece and the machining tool when the workpiece is pressed against the machining tool by the robot and is machined by the machining tool.

According to the machining system of the third aspect, the control unit extracts a specific frequency component from the records of the force value detected by the force sensor and regulates the feed speed of the workpiece pressed against the machining tool by the robot and the rotational speed of the machining tool so that the extracted frequency component is between a predetermined upper threshold and a predetermined lower threshold.

According to the fourth aspect of the present invention, in the machining system according to the third aspect, the control unit comprises a frequency analyzing portion which extracts a specific frequency component from records of the force value detected by the force sensor, a judgment portion which judges whether the frequency component extracted by the frequency analyzing portion is between the predetermined upper threshold and the predetermined lower threshold, and an operation commanding portion which reduces one of the workpiece feed speed and the rotational speed of the machining tool when the judgment portion judges that the frequency component is above the predetermined upper threshold; as a result, if the frequency component is still above the predetermined upper threshold, the other of the workpiece feed speed and the rotational speed of the machining tool is reduced; and which increases one of the workpiece feed speed and the rotational speed of the machining tool when the judgment portion judges that the frequency component is below the predetermined lower threshold; as a result, if the frequency component is still below the predetermined lower threshold, the other of the workpiece feed speed and the rotational speed of the machining tool is increased.

According to the fifth aspect of the present invention, in the machining system according to any one of the first to fourth aspects, the force sensor is arranged between the arm tip of the robot and the hand.

According to the sixth aspect of the present invention, in the machining system according to any one of the first to fourth aspects, the force sensor is arranged on the spindle of the processing machine.

According to the seventh aspect of the present invention, in the machining system according to any one of the first to sixth aspects, the processing machine further comprises an automatic tool exchanger which selects a machining tool corresponding to the kind of workpiece to be machined from among a plurality of machining tools and replaces a machining tool which has been attached to the spindle therewith.

According to the eighth aspect of the present invention, in the machining system according to the seventh aspect, at least one of the predetermined upper threshold and the predetermined lower threshold is replaced with another value depending on the kind of the workpiece to be machined.

These objects, features and merits and other objects, features and merits of the present invention will become more apparent from the detailed description of the representative embodiments of the present invention illustrated in the drawings.

DETAILED DESCRIPTION

Next, the embodiments of the present invention will be discussed below with reference to the drawings. In the drawings, the same components are assigned the same reference numbers. For easy understanding, the scale of the drawings has been appropriately modified. The embodiments of the machining system illustrated in the drawings are merely examples of the present invention, and the present invention is not limited to the illustrated embodiments.

(First Embodiment)

Figure 1:
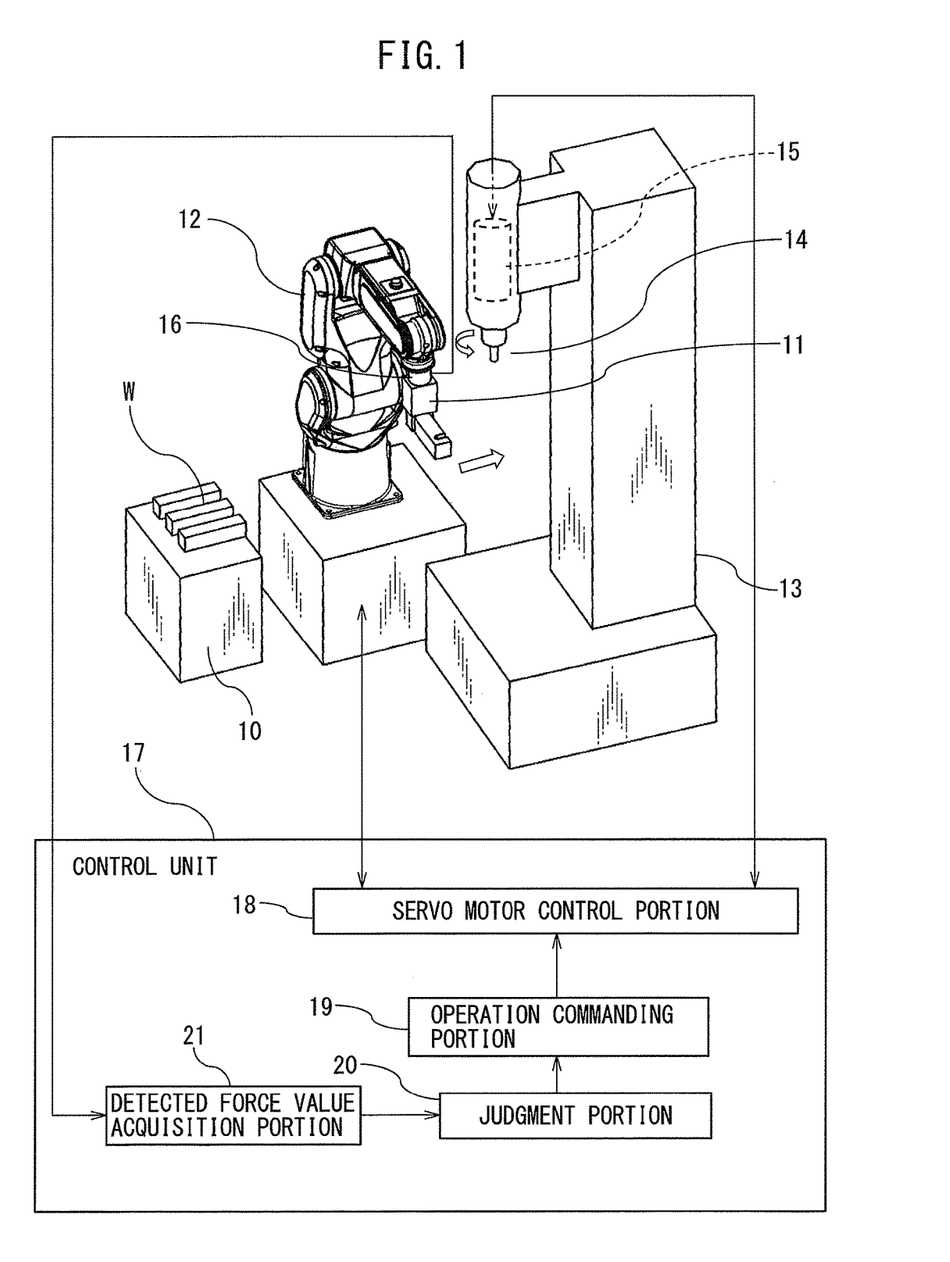
FIG. 1 is a view showing the structure of the machining system according to the first embodiment of the invention.

FIG. 1 shows a structure of the machining system according to the first embodiment.

The machining system according to the first embodiment comprises a workpiece stage 10 which places a workpiece W at a predetermined position, a robot 12 having a hand 11 attached to an arm tip thereof to grip the workpiece W, and a processing machine 13 installed in the range of movement of the hand 11 of the robot 12. The robot 12 is a multi-articulated vertical manipulator. The processing machine 13 has a machining tool 14 by which the workpiece W is machined, and a machining tool servo motor 15, which is incorporated in the spindle which rotates the machining tool 14.

In the present invention, a cutter, grinder, or an end mill, etc., is used as the machining tool 14 to perform a machining process, such as burring, polishing or grinding on the workpiece W. After the workpiece W on the workpiece stage 10 is grasped by the hand 11 of the robot 12, the grasped workpiece W is moved to the machining area of the processing machine 13 by the robot 12. The workpiece W is pressed against the machining tool 14 which is rotating to perform the machining process such as burring, polishing or grinding on the workpiece W.

As can be seen in FIG. 1, a force sensor 16 is provided at a wrist portion between the arm tip of the robot 12 and the hand 11. The force sensor 16 outputs an electrical signal which represents the force (which will be referred to as the "action force") acting between the workpiece W and the machining tool 14 while the workpiece W is pressed against the machining tool 14 which is rotating as mentioned above. For instance, the force sensor 16 may use a strain gauge attached to an elastically deformable beam or a piezoelectric transducer, etc.

Moreover, the machining system according to the first embodiment is provided with a control unit 17 which controls the robot 12 and the processing machine 13. The control unit 17 comprises a servo motor control portion (servo amplifier) 18, an operation commanding portion 19, a judgment portion 20, and a detected force value acquisition portion 21.

The detected force value acquisition portion 21 monitors and detects electrical signals, e.g., voltage (which will be referred to as the "detected force value K), outputted from the force sensor 16. The judgment portion 20 judges whether the detected force value K acquired by the detected force value acquisition portion 21 is between a predetermined upper threshold N1 and a predetermined lower threshold N2.

In order to make the preset upper and lower thresholds N1 and N2 variable, an input portion (not shown) through which the upper and lower thresholds N1 and N2 are inputted may be connected to the judgment portion 20.

The operation commanding portion 19 outputs commands to operate the robot 12 and the processing machine 13 to the servo motor control portion 18. The command for the processing machine 13 is a command to rotate the machining tool 14 at a predetermined rotational speed. The command for the robot 12 is a command to move the workpiece W held by the hand 11 to the machining area of the processing machine 13 and to move the workpiece W to the machining tool 14 which is rotating at a predetermined feed speed in accordance with a predetermined track in the machining area.

The servo motor control portion 18 controls the rotational speed of the servo motor 15 which rotates the machining tool 14 based on the command from the operation commanding portion 19. Furthermore, the servo motor control portion 18 controls the conveyance of the workpiece W from the workpiece stage 10 to the machining tool 14 based on the command from the operation commanding portion 19. Namely, the robot servo motors (not shown) which drive the shafts of the respective joints of the robot 12 are controlled by the servo motor control portion 18.

The operation of the machining system according to the first embodiment will be discussed below.

Figure 2A:
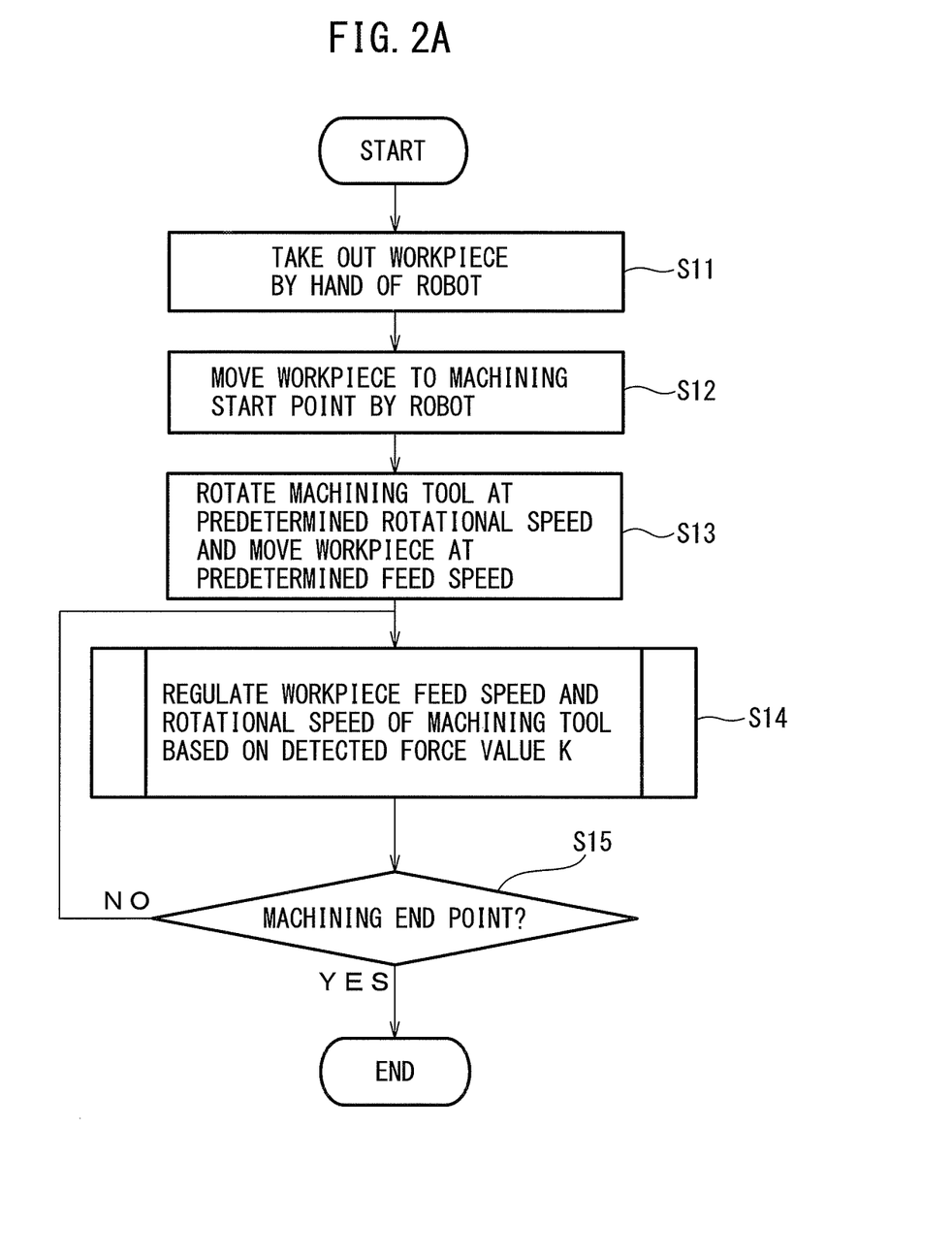
FIG. 2A is a flow chart for explaining the operation of the machining system according to the first embodiment.

FIG. 2A is a flow chart for explaining the operation of the machining system according to the first embodiment. The operation commanding portion 19 of the control unit 17 outputs operation commands for the robot 12 and the processing machine 13 to the servo motor control portion 18. The servo motor control portion 18 controls the servo motor (not shown) for each shaft of the robot 12 to move the hand 11 and the robot 12 in accordance with the respective commands. Regarding the operation command to the robot 12, the robot 12 grasps and takes out the unmachined workpiece W by the hand 11 of the robot 12 from the workpiece stage 10 (step S11 in FIG. 2A). Thereafter, the robot 12 moves the workpiece W to the machining start point of the processing machine 13 (step S12 in FIG. 2A). After that, the robot 12 moves the workpiece W which is held by the hand 11 from the machining start point toward the machining tool 14 at a predetermined feed speed in accordance with the predetermined track. At this time, the servo motor control portion 18 causes the machining tool servo motor 15 of the processing machine 13 to rotate at a predetermined rotational speed (step S13 in FIG. 2A). Consequently, the workpiece W is pressed against the machining tool 14 which is rotating, and therefore the machining of the workpiece W such as burring, polishing or grinding begins.

After step S13, the detected force value acquisition portion 21 of the control unit 17 monitors the detected force value K of the force sensor 16. During monitoring of the detected force value K, the operation commanding portion 19 regulates the workpiece feed speed of the robot 12 and the rotational speed of the machining tool 14 based on detected force value K of the force sensor 16 (step S14 in FIG. 2A). The operation at step S14 continues until the workpiece W reaches the machining end point of the processing machine 13. When the workpiece W has reached the machining end point, the machining operation ends (step S15 in FIG. 2A).

Figure 2B:
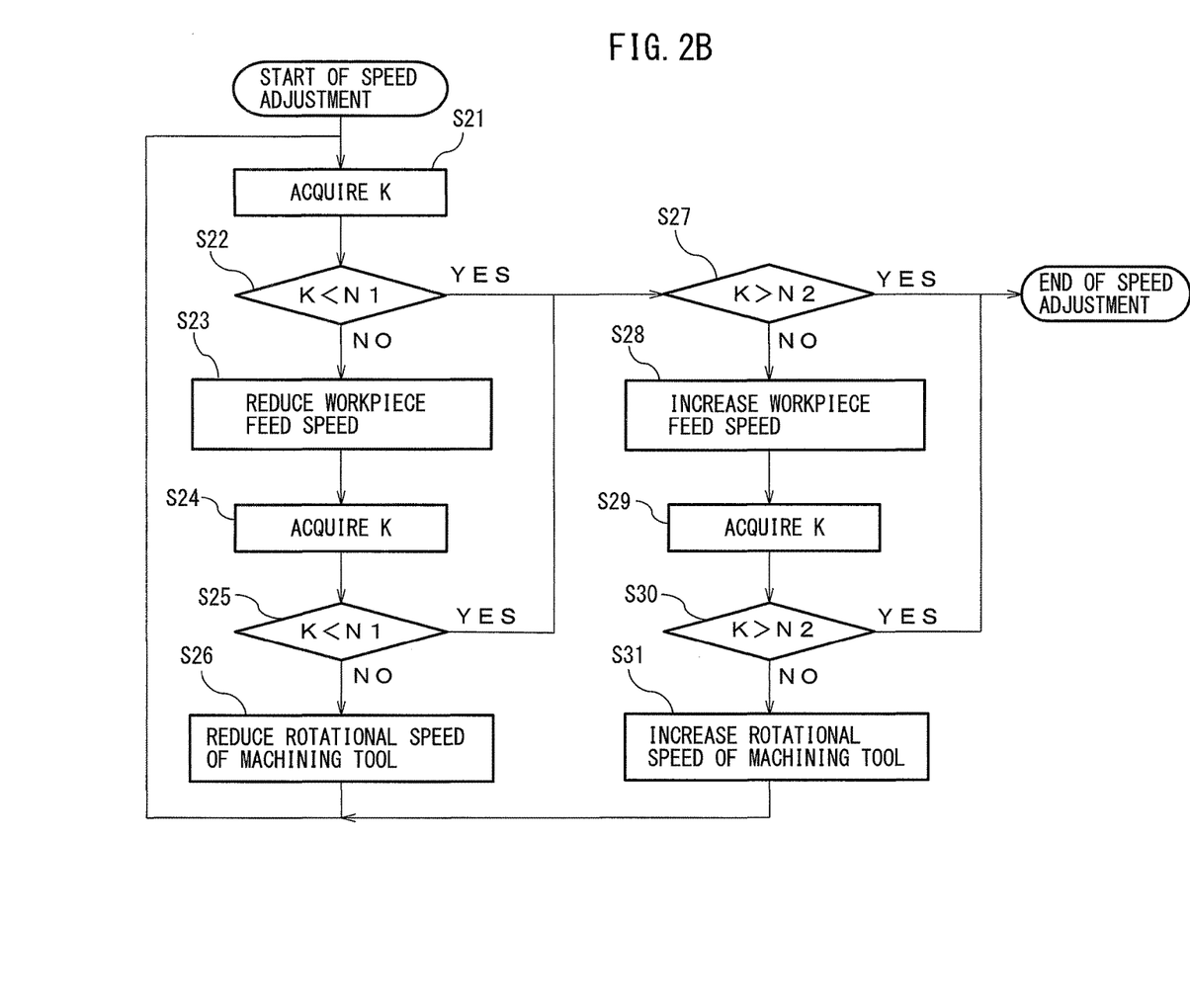
FIG. 2B is a flow chart which specifically shows the speed adjustment process at step S14 shown in FIG. 2A.

With reference to FIG. 2B, the process at step S14 will be discussed below in more detail. FIG. 2B is a flow chart which specifically shows the speed regulation operation in step S14 in FIG. 2A.

When the operation at step S14 begins, as shown in FIG. 2B, the detected force value acquisition portion 21 of the control unit 17 acquires the detected force value K of the force sensor 16 (step S21). After that, the judgment portion 20 of the control unit 17 compares the detected force value K with the predetermined upper threshold N1 (step S22).

If the detected force value K is above the predetermined upper threshold N1 at step S22, the operation commanding portion 19 reduces the feed speed of the workpiece W by a first slight speed quantity (step S23). Conversely, if the detected force value K is below the predetermined upper threshold N1 at step S22, the control proceeds to step S27. The operations at step S27 and the subsequent steps will be discussed hereinafter.

After step S23, the detected force value acquisition portion 21 of the control unit 17 acquires again the detected force value K of the force sensor 16 (step S24). After that, the judgment portion 20 of the control unit 17 compares the detected force value K obtained at step S24 with the predetermined upper threshold N1 (step S25).

If the detected force value K obtained at step S24 is still above the predetermined upper threshold N1, the operation commanding portion 19 reduces the rotational speed of the machining tool 14 by a second slight speed quantity (step S26). After that, the control is returned to step S21, and the operations at step S21 to S26 are repeated until the detected force value K at step S24 is below the predetermined upper threshold N1. If the detected force value K at step S24 is below the predetermined upper threshold N1, the control proceeds to step S27.

At step S27, the judgment portion 20 of the control unit 17 compares the detected force value K obtained at step S21 or S24 with the predetermined lower threshold N2 (step S27). As a result, if the detected force value K obtained at step S21 or S24 is below the predetermined lower threshold N2 at step S22, the operation commanding portion 19 increases the workpiece feed speed of the robot 12 by the first slight speed quantity (step S28).

If the detected force value K obtained at step S21 or S24 is above the predetermined lower threshold N2, it is judged that a desired machining quality of the workpiece W is maintained. Therefore, the operation commanding portion 19 completes the speed regulation process and the control proceeds to step S15 shown in FIG. 2A.

After step S28, the detected force value acquisition portion 21 of the control unit 17 acquires again the detected force value K of the force sensor 16 (step S29). After that, the judgment portion 20 of the control unit 17 compares the detected force value K obtained at step S29 with the predetermined lower threshold N2 (step S30).

If the detected force value K obtained at step S29 is still below the predetermined lower threshold N2, the operation commanding portion 19 increases the rotational speed of the machining tool 14 by the second slight speed quantity (step S31). After that, the control is returned to step S21, and the operations at step S21 to S31 are repeated until the detected force value K at step S29 is above the predetermined lower threshold N2. If the detected force value K at step S29 is above the predetermined lower threshold N2, it is judged that the desired machining quality of the workpiece W is maintained. Therefore, the operation commanding portion 19 terminates the speed regulation process and the control proceeds to step S15 shown in FIG. 2A.

As can be seen from the foregoing, the workpiece W is machined while complexly adjusting the rotational speed of the machining tool 14 and the workpiece feed speed of the robot 12 so that the detected force value K of the force sensor 16 is maintained to be between the upper threshold N1 and the lower threshold N2. Therefore, even if the machining tool 14 is deteriorated due to the material of the workpiece W or machining time (e.g., wearing of the blade or abrasive), it is possible to maintain the machining quality of the workpiece W.

Naturally, the upper threshold N1, the lower threshold N2, the first slight speed quantity by which the feed speed of the workpiece W relative to the machining tool 14 is increased or decreased, and the second slight speed quantity by which the rotational speed of the machining tool 14 is increased or decreased, can be variably preset prior to the machining operation.

The upper threshold N1 and the lower threshold N2 may be preferably determined by performing test machining of the workpiece W beforehand. For example, first, the rotational speed of the machining tool 14, the feed speed of the workpiece W relative to the machining tool 14 are set based on the material and shape, etc., of the workpiece W. The robot 12 performs test machining of the workpiece W by moving and pressing the workpiece W at the set feed speed against the machining tool 14 which is rotating at the set rotational speed. After the test machining, the operator of the machining system examines the machining quality of the workpiece W. The operator performs examinations while increasing the set value of the workpiece feed speed stepwise from zero and obtains the detected force value K of the force sensor 16 in each examination. As a result, the largest value and the smallest value among the detected force values K of the force sensor 16 at which the machining quality of the workpiece W is considered to be appropriate can be determined as the upper threshold N1 and the lower threshold N2, respectively.

Note that, in the aforementioned first embodiment, the rotational speed of the machining tool 14 is adjusted after the adjustment of the feed speed of the workpiece W relative to the machining tool 14 (S23, S26, S28, S31 in FIG. 2B). However, in the present invention, the sequence of the adjustments of the workpiece feed speed and the rotational speed of the machining tool may be reversed. Namely, the feed speed of the workpiece W relative to the machining tool 14 may be adjusted at step S26 or S31 in FIG. 2B after the adjustment of the rotational speed of the machining tool 14 at step S23 or S28 in FIG. 2B.

Alternatively, at step S23 in FIG. 2B, both the feed speed of the workpiece W relative to the machining tool 14 and the rotational speed of the machining tool 14 may be reduced and at step S28 in FIG. 2B, both the feed speed of the workpiece W relative to the machining tool 14 and the rotational speed of the machining tool 14 may be increased.

(Second Embodiment)

Next, the second embodiment will be discussed below. The same components as those in the first embodiment are assigned the same reference numerals and no duplicate explanation thereof will be given hereinafter. Only the components different from those in the first embodiment will be described below.

Figure 3:
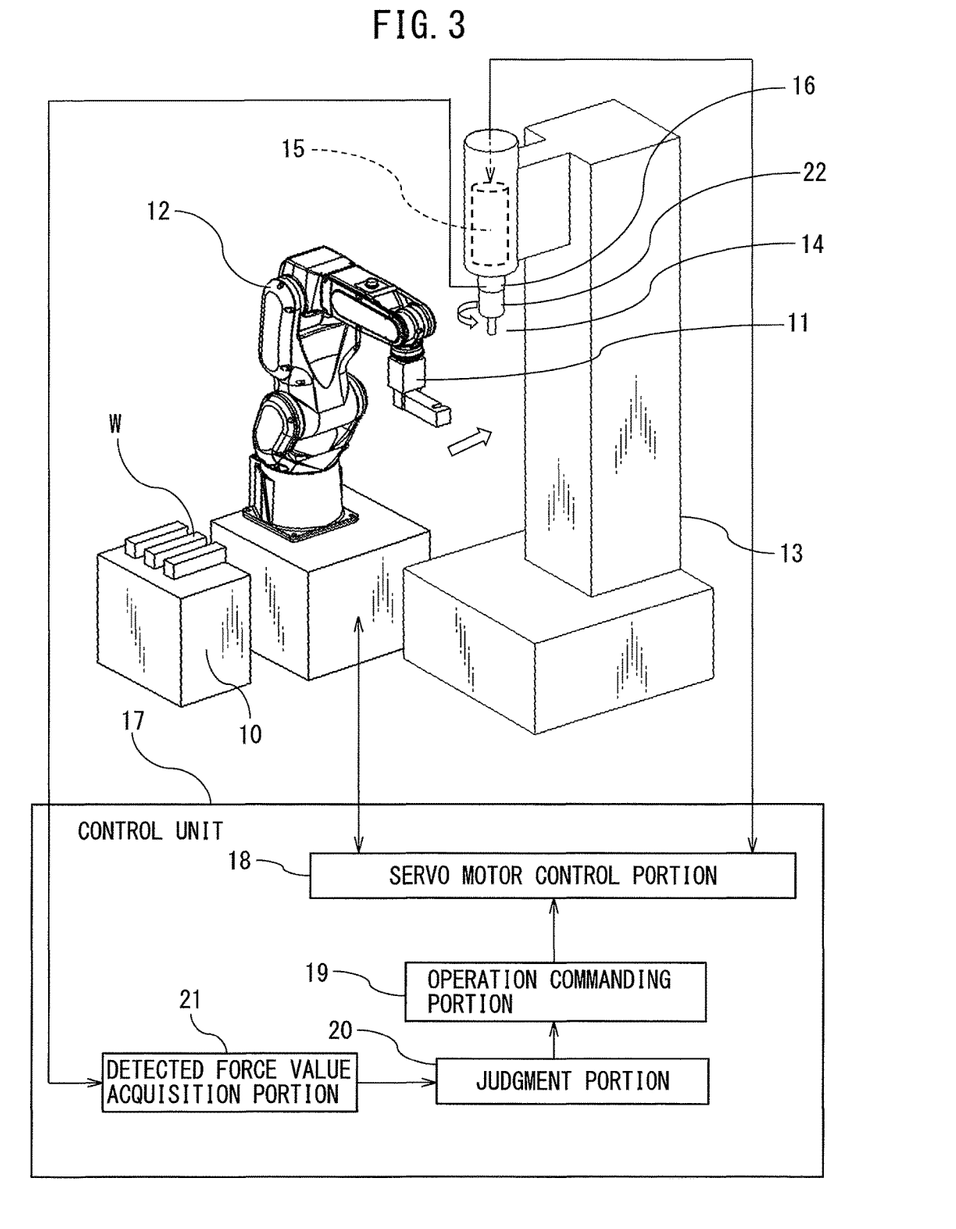
FIG. 3 is a view showing the structure of the machining system according to the second embodiment of the invention.

FIG. 3 shows the structure of the machining system according to the second embodiment.

In the first embodiment illustrated in FIG. 1, the force sensor 16 is provided at the wrist portion between the arm tip of the robot 12 and the hand 11. However, the force sensor 16 may be provided on not the robot 12 but the processing machine 13.

Namely, in the second embodiment, the force sensor 16 is provided on the spindle of the processing machine 13 as shown in FIG. 3. More specifically, the force sensor 16 is arranged between the servo motor 15 for the machining tool and the machining head 22 which is rotated by the machining tool servo motor 15. The machining tool 14 is detachably attached to the machining head 22.

According to the second embodiment, as the force sensor 16 is attached to the spindle of the processing machine 13, the wrist portion of the robot 12 can be miniaturized compared with the first embodiment. However, in the present invention, the place where the force sensor 16 is arranged is not limited to a specific place. The force sensor 16 can be arranged in any place where the force acting between the workpiece W and the machining tool 14 can be appropriately detected when the workpiece W is pressed against the machining tool 14 which is rotating.

Note that, the remaining structures of the second embodiment are the same as those of the first embodiment. The mode of operation of the machining system according to the second embodiment is the same as that of the aforementioned machining system according to the first embodiment (see FIGS. 2A, 2B).

(Third Embodiment)

The third embodiment will be discussed below. The same components as those in the first embodiment are assigned the same reference numerals and no duplicate explanation thereof will be given hereinafter. Only the components different from those in the first embodiment will be described below.

Figure 4:
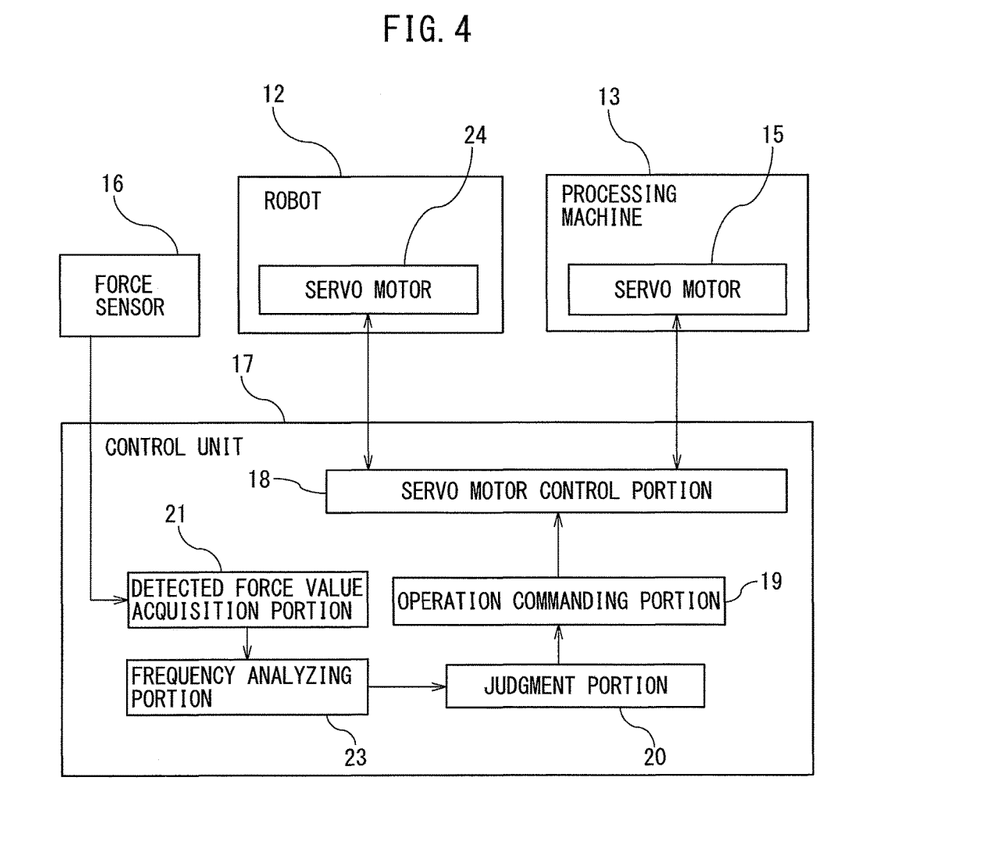
FIG. 4 is a view showing the structure of the machining system according to the third embodiment of the invention.

FIG. 4 shows the structure of the machining system according to the third embodiment.

In the third embodiment, the control unit 17 includes therein a frequency analyzing portion 23, as shown in FIG. 4.

More specifically, the frequency analyzing portion 23 performs a frequency analysis, e.g., FFT (Fast Fourier Transform) analysis of the history of the detected force value K of the force sensor 16 which is monitored by the detected force value acquisition portion 21. The frequency analyzing portion 23 resolves the records of the detected force value K of the force sensor 16 into a plurality of frequency components by the FFT analysis and extracts a specific frequency component F from among the plurality of frequency components and transmits the same to the judgment portion 20.

The specific frequency component F to be extracted is a frequency of a load change which occurs when the workpiece W is machined by the machining tool 14 against which the workpiece W is pressed. When such a frequency of load change exceeds a predetermined frequency range, it is considered that a so-called "chattering" phenomenon of the workpiece W occurs. In this embodiment, the specific frequency component F is extracted from the records of the detected force value K of the force sensor 16 to avoid the "chattering" phenomenon.

To this end, the judgment portion 20 judges whether the specific frequency component F transmitted from the frequency analyzing portion 23 is in the range between the predetermined upper threshold N3 and the predetermined lower threshold N4. In order to make the set upper and lower thresholds N3 and N4 variable, an input portion (not shown) by which the upper and lower thresholds N3 and N4 can be input may be connected to the judgment portion 20.

The operation commanding portion 19 outputs commands to operate the robot 12 and the processing machine 13 to the servo motor control portion 18 based on the judgment of the judging portion 20. The command for the processing machine is a command to rotate the machining tool 14 at a predetermined rotational speed. The command for the robot 12 is a command to move the workpiece W held by the hand 11 to the machining area of the processing machine 13 and to move the workpiece W to the machining tool 14 which is rotating at a predetermined feed speed in accordance with a predetermined track in the machining area.

The servo motor control portion 18 controls the rotational speed of the servo motor 15 which rotates the machining tool 14 based on the command from the operation commanding portion 19. Furthermore, the servo motor control portion 18 controls the conveyance of the workpiece W from the workpiece stage 10 to the machining tool 14 based on the command from the operation commanding portion 19. Namely, the robot servo motors (not shown) which drive the shafts of the respective joints of the robot 12 are controlled by the servo motor control portion 18.

The remaining structures of the third embodiment are the same as those of the first embodiment (FIG. 1) or the second embodiment (FIG. 3). Note that, the force sensor 16 in the third embodiment can be arranged in any place between the arm tip of the robot 12 and the hand 11 or between the servo motor 15 for the machining tool of the processing machine 13 and the machining head 22.

The operation of the machining system according to the third embodiment will be discussed below.

The operation of the machining system according to the third embodiment is basically identical to the operation steps S11 to S15 of the first embodiment illustrated in FIG. 2A. However, as the frequency analyzing portion 23 is additionally provided in the control unit 17, as mentioned above, the operation at step S14 is partly different from that of the first embodiment. Only this difference will be discussed below with reference to FIG. 5.

Figure 5:
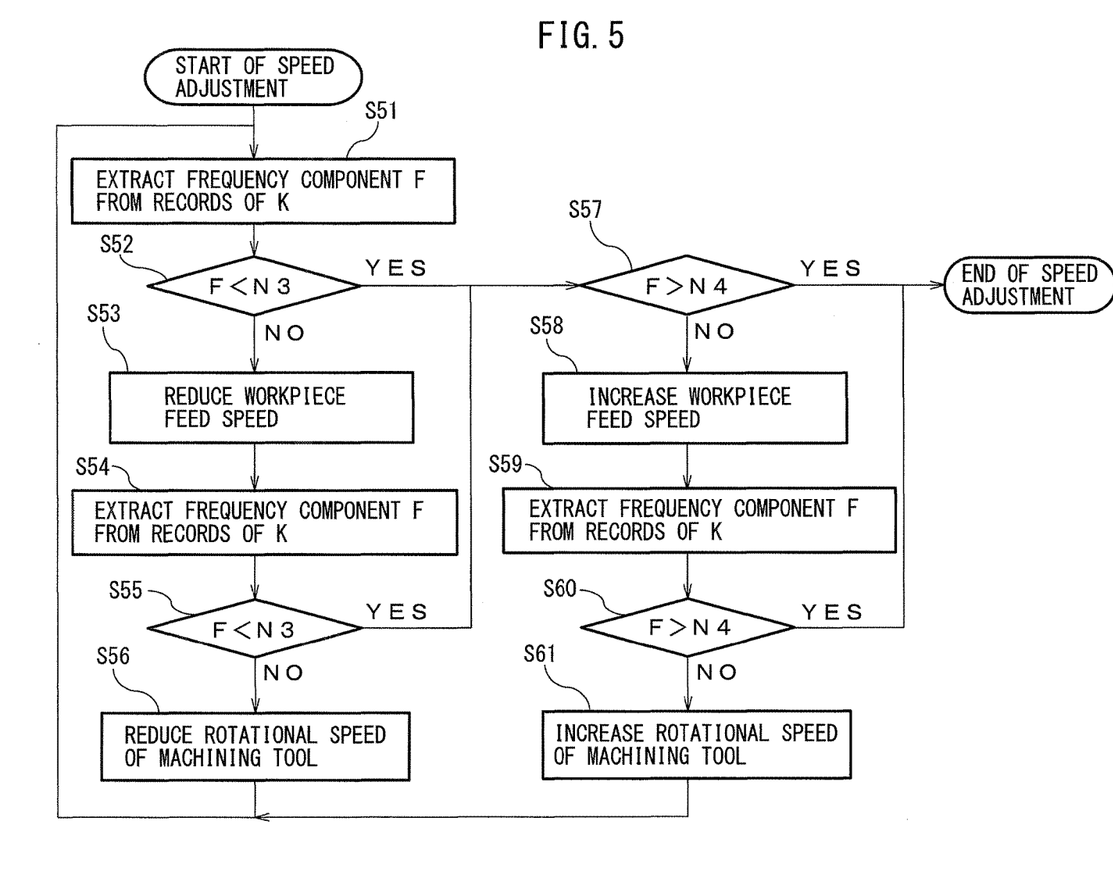
FIG. 5 is a flow chart for explaining the characteristic operation of the machining system according to the third embodiment.

FIG. 5 is a flow chart which illustrates the characteristic operation of the machining system according to the third embodiment. In particular, FIG. 5 specifically illustrates the speed regulation process at step S21 shown in FIG. 2A, according to the third embodiment.

When the speed regulation process begins as shown in FIG. 5, the frequency analyzing portion 23 of the control unit 17 performs an FFT (Fast Fourier Transform) analysis of the records of the detected force value K of the force sensor 16 which is monitored and obtained by the detected force value acquisition portion 21. The frequency analyzing portion 23 resolves the records of the detected force value K of the force sensor 16 into a plurality of frequency components by the FFT analysis and extracts the specific frequency component F from among the plurality of frequency components (step S51).

Thereafter, the judgment portion 20 of the control unit 17 compares the frequency component F with the predetermined upper threshold N3 (step S52). If the frequency component F is above the predetermined upper threshold N3 at step S52, the operation commanding portion 19 reduces the workpiece feed speed of the robot 12 by a first slight speed quantity (step S53). If the frequency component F is below the predetermined upper threshold N3 at step S52, the control proceeds to step S57. The operations at step S57 and the subsequent steps will be discussed hereinafter.

After step S53, the frequency analyzing portion 23 resolves again the records of the detected force value K of the force sensor 16 into a plurality of frequency components by the FFT analysis and extracts the specific frequency component F from among the plurality of frequency components (step S54). The judgment portion 20 of the control unit 17 compares the frequency component F extracted at step S54 with the predetermined upper threshold N3 (step S55).

As a result, if the frequency component F extracted at step S54 is still above the predetermined upper threshold N3, the operation commanding portion 19 reduces the rotational speed of the machining tool 14 by a second slight speed quantity (step S56). After that, the control is returned to step S51 and the operations at S51 to S56 are repeated until the frequency component F extracted at step S54 is below the predetermined upper threshold N3. If the frequency component F extracted at step S54 is below the predetermined upper threshold N3, the control proceeds to step S57.

At step S57, the judgment portion 20 of the control unit 17 compares the frequency component F extracted at step S51 or S54 with the predetermined lower threshold N4 (step S57). If the frequency component F extracted at step S51 or S54 is below the predetermined lower threshold N4, the operation commanding portion 19 increases the workpiece feed speed of the robot 12 by the first slight speed quantity (step S58).

If the frequency component F extracted at step S51 or 54 is above the predetermined lower threshold N4, it is judged that the machining quality of the workpiece W is maintained appropriately. Therefore, the operation commanding portion 19 terminates the speed regulation operation and the control proceeds to step S15 shown in FIG. 2A.

After step S58, again, the frequency analyzing portion 23 resolves the records of the detected force value K of the force sensor 16 into a plurality of frequency components by the FFT analysis and extracts the specific frequency component F from among the plurality of frequency components (step S59). The judgment portion 20 of the control unit 17 compares the frequency component F extracted at step S59 with the predetermined lower threshold N4 (step S60).

As a result, if the frequency component F extracted at step S59 is still below the predetermined lower threshold N4, the operation commanding portion 19 increases the rotational speed of the machining tool 14 by the second slight speed quantity (step S61). After that, the control is returned to step S51 and the operations at S51 to S61 are repeated until the frequency component F extracted at step S59 is above the predetermined lower threshold N4. If the frequency component F extracted at step S59 is above the predetermined lower threshold N4, it is judged that the machining quality of the workpiece W is maintained appropriately. Therefore, the operation commanding portion 19 terminates the speed regulation operation and the control proceeds to step S15 shown in FIG. 2A.

As can be seen from the foregoing, the workpiece W is machined while complexly adjusting the rotational speed of the machining tool 14 and the workpiece feed speed of the robot 12 so that the frequency component F extracted from the records of the detected force value K of the force sensor 16 is maintained in the range between the upper threshold N3 and the lower threshold N4. As the workpiece can be machined in such a way that the frequency component F is not a frequency at which a so-called "chattering" phenomenon occurs, it is possible to maintain the machining quality of the workpiece W.

Naturally, the upper threshold N3, the lower threshold N4, the first slight speed quantity by which the feed speed of the workpiece W relative to the machining tool 14 is increased or decreased, and the second slight speed quantity by which the rotational speed of the machining tool 14 is increased or decreased can be variably preset prior to the machining operation. Furthermore, the upper threshold N3 and the lower threshold N4 may be preferably determined by performing test machining of the workpiece W beforehand, as in the first embodiment.

Note that, in the aforementioned third embodiment, the rotational speed of the machining tool 14 is adjusted after the adjustment of the feed speed of the workpiece W relative to the machining tool 14 (S53, S56, S58, S61 in FIG. 5). However, in the present invention, the sequence of the adjustments of the workpiece feed speed and the rotational speed of the machining tool may be reversed. Namely, the feed speed of the workpiece W relative to the machining tool 14 may be adjusted at step S56 or S61 in FIG. 5 after the adjustment of the rotational speed of the machining tool 14 at step S53 or S58 in FIG. 5.

Alternatively, at step S53 in FIG. 5, both the feed speed of the workpiece W relative to the machining tool 14 and the rotational speed of the machining tool 14 may be reduced and at step S58 in FIG. 5, both the feed speed of the workpiece W relative to the machining tool 14 and the rotational speed of the machining tool 14 may be increased.

(Other Embodiments)

Figure 6:
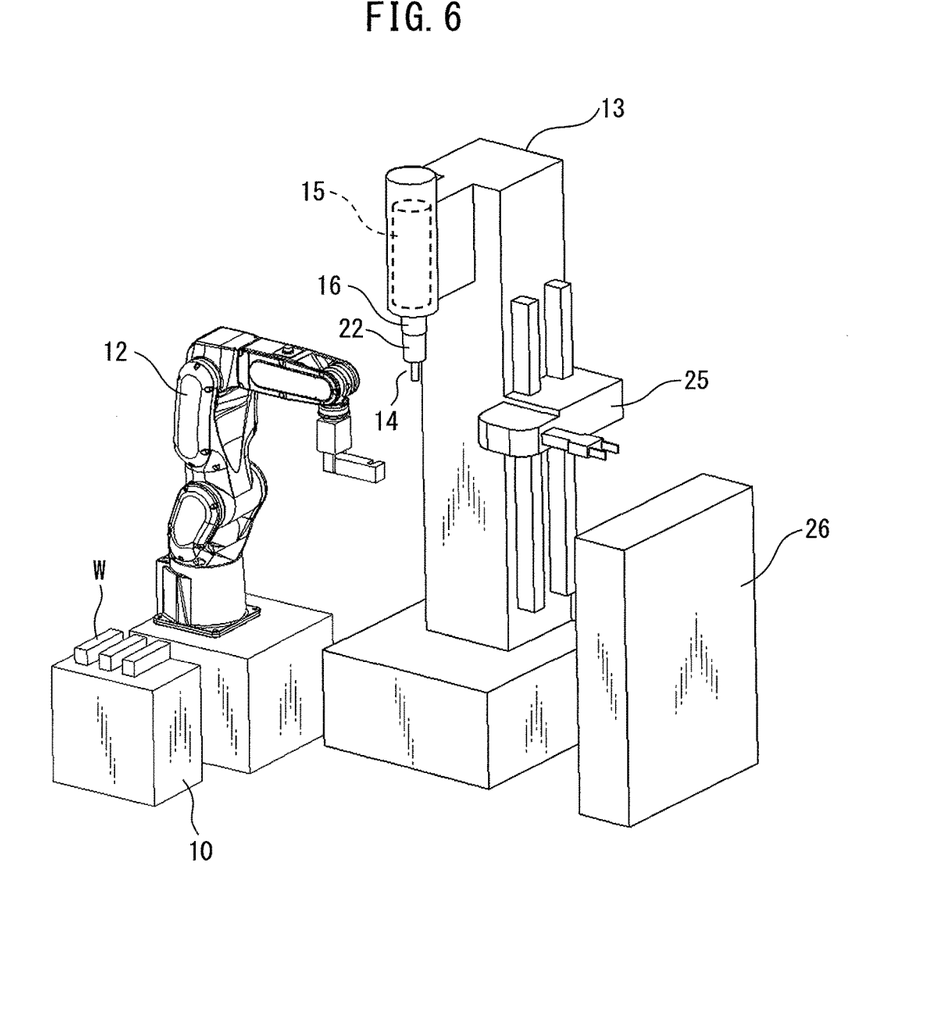
FIG. 6 is a view showing the structure of the machining system according to another embodiment of the invention.

In the machining system according to the aforementioned first, second and third embodiments, it is preferable that the machining tool 14 attached to the spindle of the processing machine 13 is replaceable with another machining tool. FIG. 6 shows another embodiment of the machining system having an exchangeable machining tool 14. In FIG. 6, the components corresponding to those of the previously mentioned embodiments are as discussed in the previous description and are assigned the same reference numerals.

More specifically, in the machining system illustrated in FIG. 6, the processing machine 13 is provided with an automatic tool exchanger 25 which is capable of replacing the machining tool 14 attached to the spindle with another machining tool. A tool stocker 26 is arranged in the vicinity of the processing machine 13. The tool stocker 26 stores therein a plurality of machining tools which can be selectively used in accordance with the type of machining operation such as burring, polishing or grinding, etc., or the kind of workpiece W to be machined. For example, when information regarding the workpiece W to be machined is inputted, the automatic tool exchanger 25 selects the machining tool corresponding to the kind of workpiece W to be machined from among the plurality of machining tools stored in the tool stocker 26 and replaces the machining tool which has been attached to the spindle of the processing machine 13 with the selected machining tool.

In the machining system illustrated in FIG. 6, the force sensor 16 detects the force acting between the workpiece W and the machining tool 14 when the workpiece W is machined while pressing it against the machining tool 14 by the robot 12. The control unit 17 (not shown in FIG. 6) of the machining system regulates the feed speed of the workpiece W which is pressed against the machining tool 14 by the robot 12 and the rotational speed of the machining tool 14 so that the force value detected by the force sensor 16 is in the range between the predetermined upper threshold and the predetermined lower threshold, as in the previous embodiments. In particular, in the machining system illustrated in FIG. 6, it is preferable that at least one of the predetermined upper and lower thresholds be replaceable with another value depending on the kind of workpiece W to be machined. This makes it possible to maintain a good machining quality of the workpiece W even if the machining tool 14 is replaced depending on the kind of the workpiece W.

Note that, in the embodiment illustrated in FIG. 6, the automatic tool exchanger 25 and the tool stocker 26 are applied to the machining system of the second embodiment (FIG. 3), but the automatic tool exchanger 25 and the tool stocker 26 may be applied to the machining system of the first embodiment (FIG. 1).

The above discussion has been directed to the representative embodiments, but the present invention is not limited thereto. The present invention can be modified in the shape, structure, or material, etc., without departing from the spirit of the invention.

Effects of the Present Invention

According to the first aspect of the present invention, when the workpiece is machined by being pressed against the machining tool by the robot, the force acting between the workpiece and the machining tool is detected by the force sensor. The control unit regulates the feed speed of the workpiece which is pressed against the machining tool by the robot, and the rotational speed of the machining tool, and thus the force value detected by the force sensor is in the range between the predetermined upper threshold and the predetermined lower threshold. Namely, compared with the prior art, the workpiece is machined by complexly adjusting the feed speed of the workpiece which is pressed against the machining tool by the robot as well as the rotational speed of the machining tool. Consequently, a high machining quality of the workpiece can be maintained even if the deterioration of the machining tool occurs during the machining operation.

According to the second aspect of the present invention, the judgment portion judges whether the detected force value of the force sensor is in the range between the predetermined upper threshold and the predetermined lower threshold. The operation commanding portion reduces or increases the workpiece feed speed of the robot and the rotational speed of the machining tool based on the judgment. As a result, the detected force value of the force sensor is controlled so as not to be above the predetermined upper threshold or below the predetermined lower threshold. Therefore, as in the first aspect, a high machining quality of the workpiece can be maintained even if the deterioration of the machining tool occurs during the machining operation.

According to the third aspect of the present invention, while the workpiece is pressed by the robot against and machined by the machining tool, the control unit extracts the specific frequency component from the records of the detected force value of the force sensor. The control unit regulates the feed speed of the workpiece which is pressed against the machining tool by the robot and the rotational speed of the machining tool so that the extracted frequency component is between the predetermined upper threshold and the predetermined lower threshold. As a result, it is possible to machine the workpiece while preventing the extracted frequency component from corresponding to a frequency at which a so-called "chattering" phenomenon occurs, and consequently, a high machining quality of the workpiece can be maintained.

According to the fourth aspect of the present invention, the judgment portion judges whether the specific frequency component extracted from the records of the detected force value of the force sensor is between the predetermined upper threshold and the predetermined lower threshold. The operation commanding portion reduces or increases the workpiece feed speed of the robot and the rotational speed of the machining tool based on the judgment result of the judgment portion. Consequently, it is possible to prevent the aforementioned specific frequency component from being above the predetermined upper threshold or below the predetermined lower threshold. As a result, as in the third aspect, a high machining quality of the workpiece can be maintained by preventing the "chattering" phenomenon from occurring during machining.

According to the fifth aspect of the present invention, the force sensor is arranged between the arm tip of the robot and the hand, and accordingly, it is possible to reliably detect the force acting between the workpiece and the machining tool when the robot presses the workpiece against the machining tool and machines the workpiece.

According to the sixth aspect of the present invention, as in the fifth aspect, it is possible to reliably detect the force acting between the workpiece and the machining tool when the robot presses the workpiece against the machining tool and machines the workpiece. In particular, as the force sensor is arranged on the spindle of the processing machine which rotates the machining tool, the wrist portion of the robot can be made smaller than in the machining system of the fifth aspect.

According to the seventh aspect of the present invention, as the automatic tool exchanger is provided, machining tools can be automatically and selectively used depending on the type of machining operations such as burring, polishing or grinding, etc., or the kind of workpiece to be machined, etc.

According to the eighth aspect of the present invention, even if the machining tool is exchanged in accordance with the kind of workpiece, the machining quality of the workpiece can be maintained highly.

What is claimed is:

1. A machining system comprising;
   a robot which has a hand provided at an arm tip to grasp a workpiece;
   a processing machine which has a spindle to rotate a machining tool;
   a control unit which controls the processing machine and the robot so as to rotate the machining tool and press the workpiece held by the hand against the machining tool to thereby machine the workpiece;
   a force sensor which detects force acting between the workpiece and the machining tool when the workpiece is pressed against the machining tool by the robot and is machined by the machining tool;
   a judgment portion which judges whether the force value detected by the force sensor is between the predetermined upper threshold and the predetermined lower threshold; and
   an operation commanding portion which regulates at least one of the feed speed of the workpiece pressed against the machining tool by the robot and the rotational speed of the machining tool so that the force value detected by the force sensor is between a predetermined upper threshold and a predetermined lower threshold by:
   reducing at least one of the workpiece feed speed and the rotational speed of the machining tool when the judgment portion judges that the detected force value is above the predetermined upper threshold, and
   increasing at least one of the feed speed and the rotational speed of the machining tool when the judgment portion judges that the detected force value is below the predetermined lower threshold.

2. The machining system according to claim 1, wherein
   if the detected force value is still above the predetermined upper threshold, the other of the workpiece feed speed and the rotational speed of the machining tool is reduced; and
   if the detected force value is still below the predetermined lower threshold, the other of the workpiece feed speed and the rotational speed of the machining tool is increased.

3. The machining system according to claim 1, wherein the force sensor is arranged between the arm tip of the robot and the hand.

4. The machining system according to claim 1, wherein the force sensor is arranged on the spindle of the processing machine.

5. The machining system according to claim 1, wherein the processing machine further comprises an automatic tool exchanger which selects a machining tool corresponding to the kind of workpiece to be machined from among a plurality of machining tools and replaces a machining tool which has been attached to the spindle therewith.

6. The machining system according to claim 5, wherein at least one of the predetermined upper threshold and the predetermined lower threshold is replaced with another value depending on the kind of workpiece to be machined.

7. A machining system comprising;
   a robot which has a hand provided at an arm tip to grasp a workpiece;
   a processing machine which has a spindle to rotate a machining tool;
   a control unit which controls the processing machine and the robot so as to rotate the machining tool and press the workpiece held by the hand against the machining tool to thereby machine the workpiece; and
   a force sensor which detects force acting between the workpiece and the machining tool when the workpiece is pressed against the machining tool by the robot and is machined by the machining tool,
   wherein the control unit extracts a specific frequency component from the records of the force value detected by the force sensor and regulates the feed speed of the workpiece pressed against the machining tool by the robot and the rotational speed of the machining tool so that the extracted frequency component is between a predetermined upper threshold and a predetermined lower threshold.

8. The machining system according to claim 7, wherein the control unit comprises;
   a frequency analyzing portion which extracts a specific frequency component from records of the force value detected by the force sensor;
   a judgment portion which judges whether the frequency component extracted by the frequency analyzing portion is between the predetermined upper threshold and the predetermined lower threshold; and
   an operation commanding portion which reduces one of the workpiece feed speed and the rotational speed of the machining tool when the judgment portion judges that the frequency component is above the predetermined upper threshold; as a result, if the frequency component is still above the predetermined upper threshold, the other of the workpiece feed speed and the rotational speed of the machining tool is reduced; and which increases one of the workpiece feed speed and the rotational speed of the machining tool when the judgment portion judges that the frequency component is below the predetermined lower threshold; as a result, if the frequency component is still below the predetermined lower threshold, the other of the workpiece feed speed and the rotational speed of the machining tool is increased.

* * * * *